United States Patent
Hirano et al.

(10) Patent No.: US 8,280,366 B2
(45) Date of Patent: Oct. 2, 2012

(54) SENSING RF ENVIRONMENT TO DETECT CHANGE IN GEOGRAPHIC LOCATION OF CELLULAR BASE STATION

(75) Inventors: Mike Hirano, Redmond, WA (US); M. Sue McMeekin, Snohomish, WA (US); Ahmed Tariq, Port Coquitlam (CA)

(73) Assignee: Broadcom Corporation, Irvine, CA (US)

( * ) Notice: Subject to any disclaimer, the term of this patent is extended or adjusted under 35 U.S.C. 154(b) by 739 days.

(21) Appl. No.: 11/645,157

(22) Filed: Dec. 21, 2006

(65) Prior Publication Data
US 2008/0085722 A1   Apr. 10, 2008

Related U.S. Application Data

(60) Provisional application No. 60/850,872, filed on Oct. 10, 2006.

(51) Int. Cl.
*H04W 88/08*   (2009.01)

(52) U.S. Cl. ...................... 455/422.1; 455/561

(58) Field of Classification Search .......... None
See application file for complete search history.

(56) References Cited

U.S. PATENT DOCUMENTS

| | | | |
|---|---|---|---|
| 5,535,259 A | | 7/1996 | Dent et al. |
| 6,104,922 A * | | 8/2000 | Baumann ................ 455/410 |
| 6,888,817 B1 | | 5/2005 | Shyy et al. |
| 6,950,667 B2 | | 9/2005 | Roy et al. |
| 6,999,725 B2 * | | 2/2006 | Nitta et al. .................. 455/63.1 |
| 7,324,813 B2 * | | 1/2008 | Mountney et al. ......... 455/422.1 |
| 7,356,389 B2 * | | 4/2008 | Holst et al. ...................... 701/3 |
| 7,498,984 B2 * | | 3/2009 | Taniguchi ................ 342/357.15 |
| 2003/0003874 A1 * | | 1/2003 | Nitta et al. ................... 455/67.1 |
| 2003/0054838 A1 | | 3/2003 | Carrez |
| 2004/0116133 A1 | | 6/2004 | Kalhan et al. |
| 2004/0204097 A1 * | | 10/2004 | Scheinert et al. ............. 455/561 |
| 2005/0226152 A1 * | | 10/2005 | Stephens et al. .............. 370/230 |
| 2006/0009191 A1 * | | 1/2006 | Malone, III ................ 455/404.1 |
| 2006/0121916 A1 | | 6/2006 | Aborn et al. |
| 2007/0021122 A1 * | | 1/2007 | Lane et al. .................... 455/441 |
| 2007/0111737 A1 * | | 5/2007 | Swope et al. ............... 455/456.2 |
| 2007/0150565 A1 * | | 6/2007 | Ayyagari et al. ............. 709/223 |
| 2008/0002658 A1 * | | 1/2008 | Soliman ....................... 370/343 |

OTHER PUBLICATIONS

International Search Report directed to related International Patent Application No. PCT/US2007/021463, mailed Apr. 2, 2008, from the International Searching Authority; 3 pages International Preliminary Report on Patentability with the Written Opinion of the International Searching Authority directed to related International Patent Application No. PCT/US2007/021463, mailed Apr. 15, 2009, from the International Bureau of WIPO; 6 pages.

* cited by examiner

*Primary Examiner* — Marcos Batista
*Assistant Examiner* — Frank Donado
(74) *Attorney, Agent, or Firm* — Sterne, Kessler, Goldstein & Fox P.L.L.C.

(57) ABSTRACT

Using radio frequency sensing to detecting that a cellular base station has been moved to a new geographic location is disclosed. A determination is made that a sensed radio frequency environment does not match a stored baseline. It is concluded, based at least in part on the determination that a sensed radio frequency environment does not match a stored baseline, that the cellular base station has been moved.

21 Claims, 7 Drawing Sheets

SENSING RF ENVIRONMENT TO DETECT CHANGE IN GEOGRAPHIC LOCATION OF CELLULAR BASE STATION

CROSS REFERENCE TO OTHER APPLICATIONS

This application claims priority to U.S. Provisional Patent Application No. 60/850,872 entitled Method of RF Monitoring, filed Oct. 10, 2006, which is incorporated herein by reference for all purposes.

BACKGROUND OF THE INVENTION

In a traditional mobile telecommunication network, mobile stations (e.g., mobile phones) communicate via an air link with a stationary base transceiver station (BTS), typically a tower or other structure with one or more antennas and associated radio transceivers. A traditional BTS typically relays data between mobile stations and the core mobile network via a dedicated communication link to a base station controller (BSC). However, smaller base transceiver stations have been developed, e.g., for personal use in the home, dedicated use by a small business or other enterprise, dedicated or additional coverage for areas with high user density or demand (such as airports), etc. Such smaller base transceiver stations are sometimes referred to herein and in the industry by a variety of terms, depending on their size and configuration, including without limitation by terms such as "micro-BTS", "pico-BTS", and "femto-BTS", which terms distinguish such smaller scale installations from a traditional "BTS", which is sometimes referred to as a "macro-BTS" deployed to serve an associated "macro-cell". Deployment of such smaller base transceiver stations poses challenges to mobile telecommunications network operators and equipment providers, including the need to know that a deployed small scale BTS has not been moved without authorization to a location in which the small scale BTS is not authorized to operate.

BRIEF DESCRIPTION OF THE DRAWINGS

Various embodiments of the invention are disclosed in the following detailed description and the accompanying drawings.

DETAILED DESCRIPTION

Figure 1:
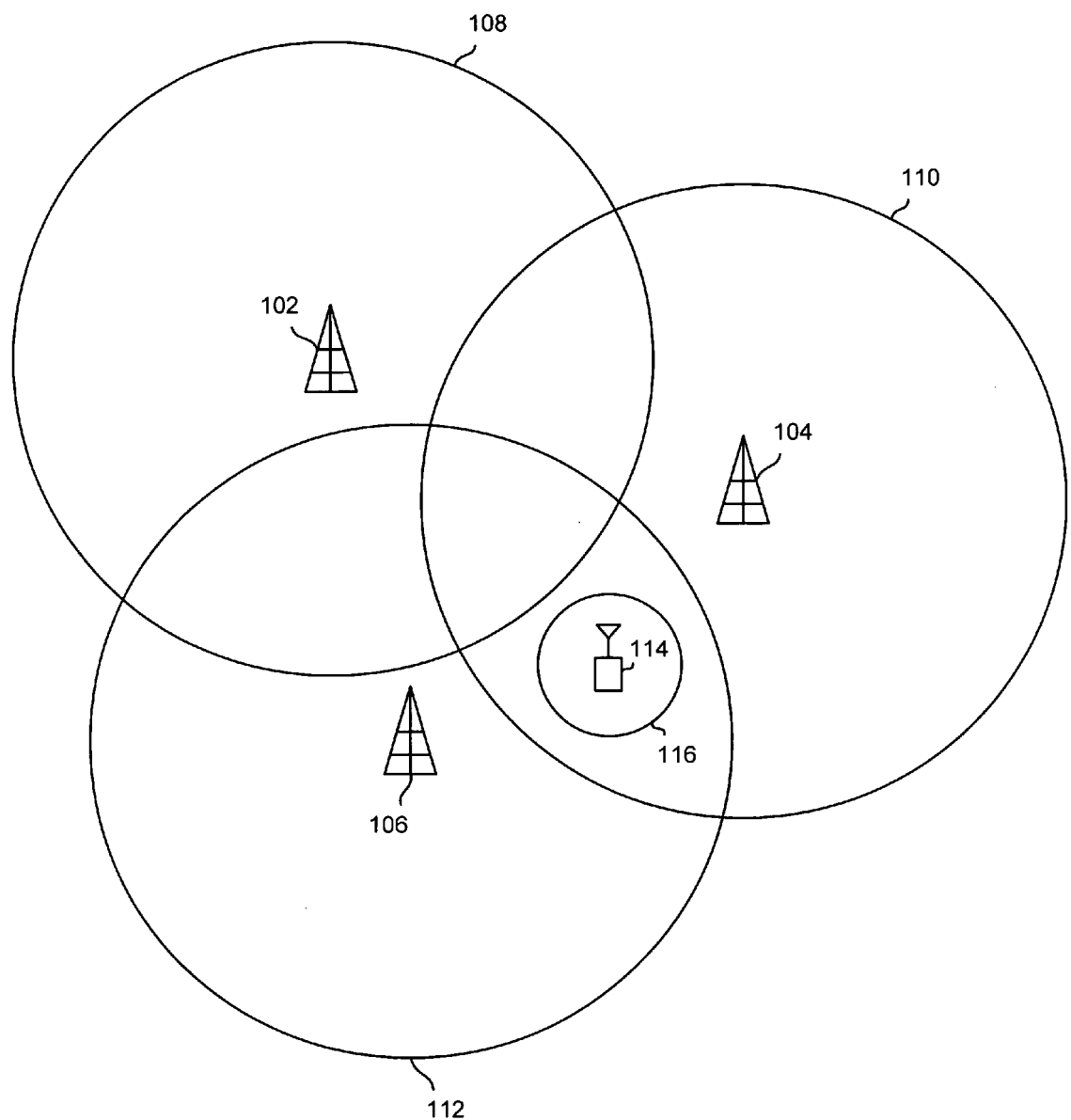
FIG. 1 is a block diagram illustrating an embodiment of a portion of a cellular network in which a small scale base station has been deployed.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sensing an RF environment to determine whether a mobile telecommunications network asset, such as a small scale base station, has been moved to a different geographic location is disclosed. In some embodiments, a small scale base station, such as a micro-, pico-, or femto-BTS, includes an RF sensing or "sniffing" subsystem that enable the base station to sense the RF environment in a location in which the base station is located. In some embodiments, on initial startup (or at other prescribed times and/or conditions), the base station senses the RF environment and stores an RF signature characteristic and/or representative of the location. Subsequently, the RF environment is sensed and any changes evaluated to determine whether an RF environment as currently (or recently) sensed is different than the stored signature in a way that indicates the geographic location of the base station has changed between a prior time when the RF environment was sensed to generate the signature and a later time when the current (or more recent) RF environment information was obtained. In some embodiments, a current RF environment is compared against configured and/or provisioned information other than a previously sensed environment, such as by comparing a mobile country code and/or mobile network code included in a sensed beacon or other signal from a macrocell to an authorized country and/or network code associated with the small scale base station or other potentially movable network equipment.

FIG. 1 is a block diagram illustrating an embodiment of a portion of a cellular network in which a small scale base station has been deployed. Each of the macrocell base transceiver stations (BTS) 102, 104, and 106 has associated with it a corresponding geographic coverage area 108, 110, and 112, respectively, within which its signal is strong enough to be received and used by a mobile station (MS) to communicate with the core mobile telecommunication network via that BTS. In areas in which two or more coverage areas overlap, an MS could in theory communicate with the core mobile network via any BTS having coverage in that area. A small scale base station 114 having an associated coverage area 116 has been deployed, e.g., in a home or office, in a location such that the coverage area 116 overlaps (and in this example, for clarity of illustration, falls entirely within) the region in which coverage area 110 of BTS 104 and coverage area 112 of BTS 106 overlap.

Figure 2:
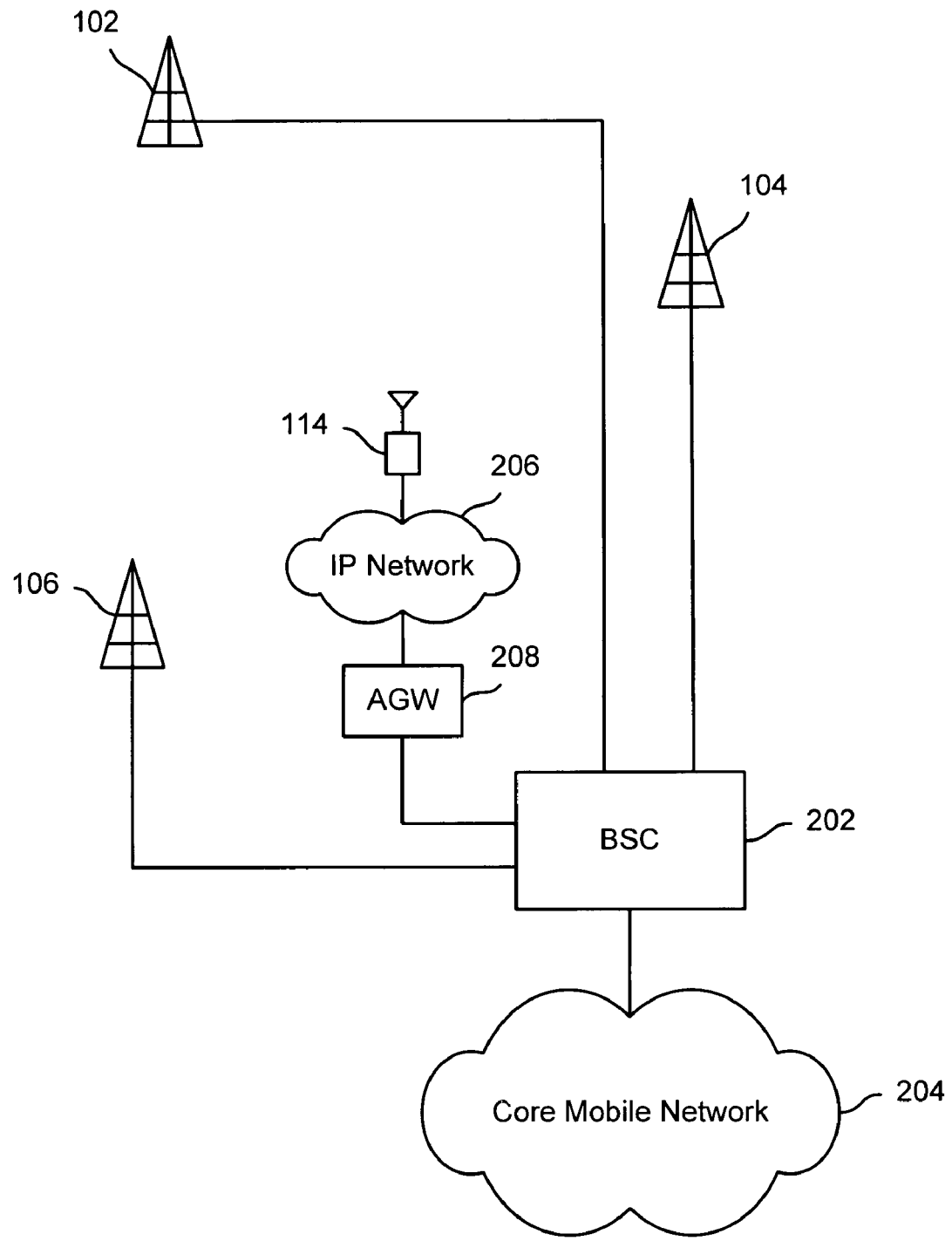
FIG. 2 is a block diagram illustrating an embodiment of a micro-, pico-, and/or femto-BTS or other small and/or potential movable base transceiver station with IP network backhaul.

FIG. 2 is a block diagram illustrating an embodiment of a micro-, pico-, and/or femto-BTS or other small and/or potential movable base transceiver station with IP network backhaul. In the example shown, macrocell BTS's 102, 104, and 106 communicate with the core mobile network 204 via a dedicated land line (e.g., T-1/E-1) to a BSC 202. The small scale BTS 114 is shown as being connected to BSC 202 via an IP network 206 and an aggregation gateway (AGW) 208. In some embodiments, AGW 208 is configured to support one or more small scale BTS's such as BTS 114, aggregating their traffic and translating traffic sent via the IP network 206 using a suitable protocol, e.g., the real-time transport protocol (RTP) for voice traffic, to the Abis (for GSM) or similar interface to the BSC 202 (or equivalent node in a non-GSM network), and vice versa. As high-speed Internet access for homes and small businesses becomes more and more ubiquitous, it has become and will continue to become more and more possible to deploy small scale base stations in homes and businesses, and use IP backhaul to provide connectivity to the core mobile network, avoiding the cost and waste of bandwidth that would attend if each such base station required a dedicated T-1/E-1 or other high capacity connection.

One challenge faced by mobile network providers in connection with deploying, operating, and monitoring small scale base stations such as BTS 114 in the examples shown in FIGS. 1 and 2 is that such small scale base stations may be small and light enough to be moved to a geographic location in which they are not authorized to be moved and/or from a specified geographic location in which they are intended and configured (e.g., provisioned) to be used. In the example shown in FIGS. 1 and 2, a small scale base station that it is physically possible to move could be moved and used in any location having Internet access, unless measures are taken to detect that the base station has moved and prevent its use at an unauthorized location. For example, a small scale base station sold and intended for use in a home in one area could be resold and/or moved, without the network and/or service provider's permission, for use in another location. If not properly configured and/or authorized, such use in another location (e.g., another country, or out of the provider's service area) may violate government regulations, spectrum or other license and/or ownership rights of other providers, international telecommunications rules and agreements, the national or local laws of other countries, etc.; result in a loss of revenue and/or business opportunity, e.g., to sell or lease a base station to a second subscriber at the location to which the small scale base station has been moved; and/or facilitate a market for the sale and/or use of stolen base station equipment.

Configuring a small scale base station or other mobile network equipment to sense a local radio frequency (RF) environment to detect that the base station or other equipment has been moved to a new geographic location is disclosed.

Figure 3A:
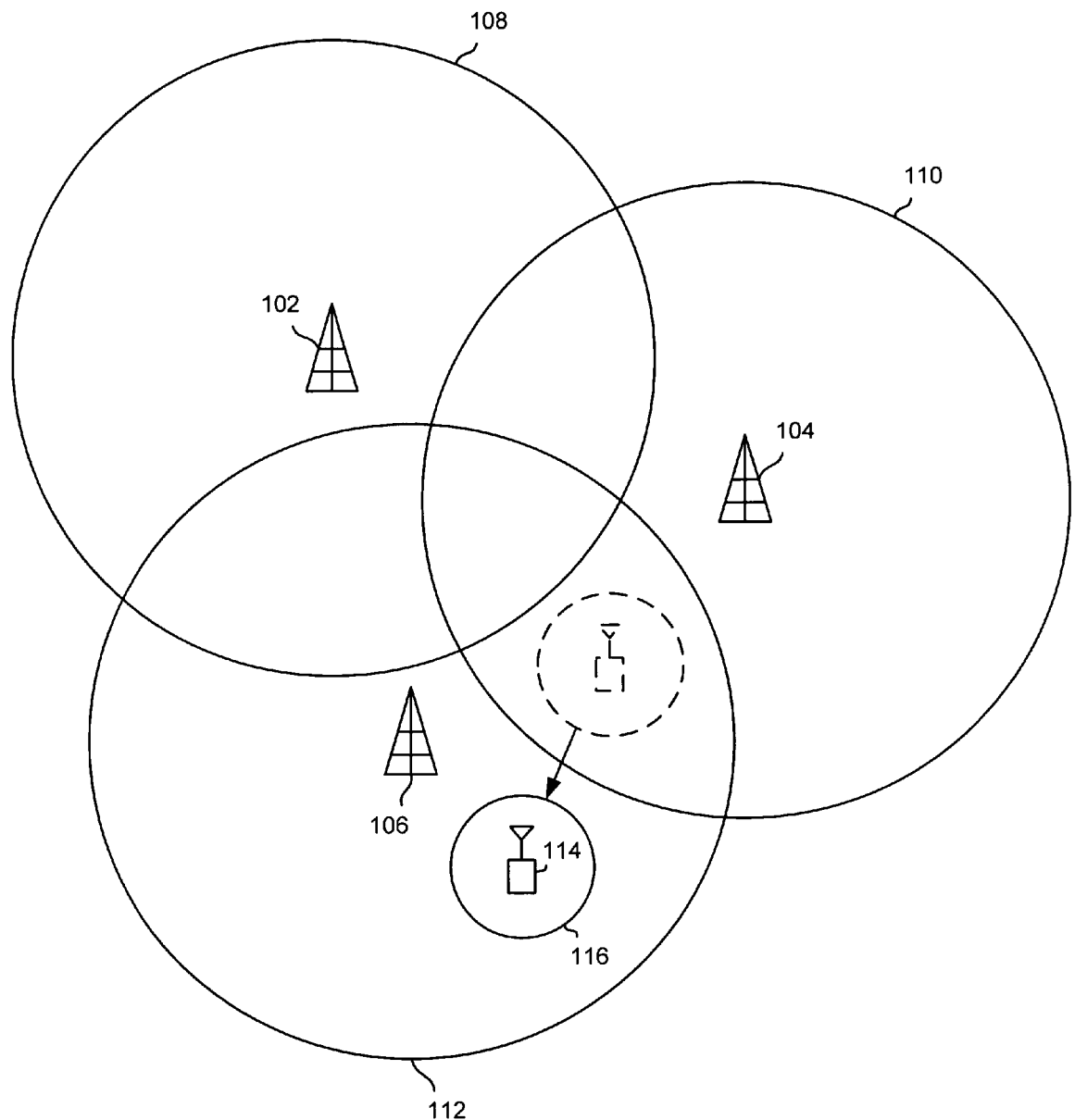
FIG. 3A is a block diagram illustrating an embodiment of a cellular network in which a small scale base station is configured to sense the local RF environment to detect that the geographic location of the small scale base station has changed.

FIG. 3A is a block diagram illustrating an embodiment of a cellular network in which a small scale base station is configured to sense the local RF environment to detect that the geographic location of the small scale base station has changed. In the example shown, the small scale base station 114 is shown to have been moved from an initial location as shown in FIG. 1 to a new location as shown in FIG. 3A. The original location (indicated in FIG. 3A by showing in broken lines at the original location an outline of base station 114 and its associated coverage area 116), as noted above, was in the region in which the coverage area 110 of BTS 104 and the coverage area 112 of BTS 106 overlap. In some embodiments, small scale base station 114 is configured to sense the local RF environment upon being deployed in the original location and/or sometime and/or from time to time thereafter, and to store an RF signature of the current (in this example the original) location. In the example shown, the original signature would include in some embodiments data associated with a first beacon or other signal broadcast by BTS 104 and a second beacon or other signal broadcast by BTS 106, since in the original location the small scale base station 114 would have received both signals. In the new location to which base station 114 has been moved in this example, however, the base station 114 would no longer detect the first beacon or other signal associated with BTS 104, and would instead detect only the second beacon signal associated with the BTS 106. In some embodiments, base station 114 is configured to sense a current local RF environment, compare at least relevant aspects of the current environment to a stored signature or other reference, and conclude the base station 114 has (or may have been) moved if the local RF environment is determined to have changed in a way that indicates the base station 114 has (or may have been) moved. In the example shown in FIG. 3A, in some embodiments the small scale base station 114 would detect that the beacon or other signal associated with BTS 104 is no longer being detected and would conclude that the base station 114 has (or may have been) moved from a location within the coverage area 110 of BTS 104 to a new location outside of coverage area 110. In various embodiments, the base station 114 is configured to respond to such a determination by shutting down, denying service, denying access to the core network, and/or sending an alert.

Figure 3B:
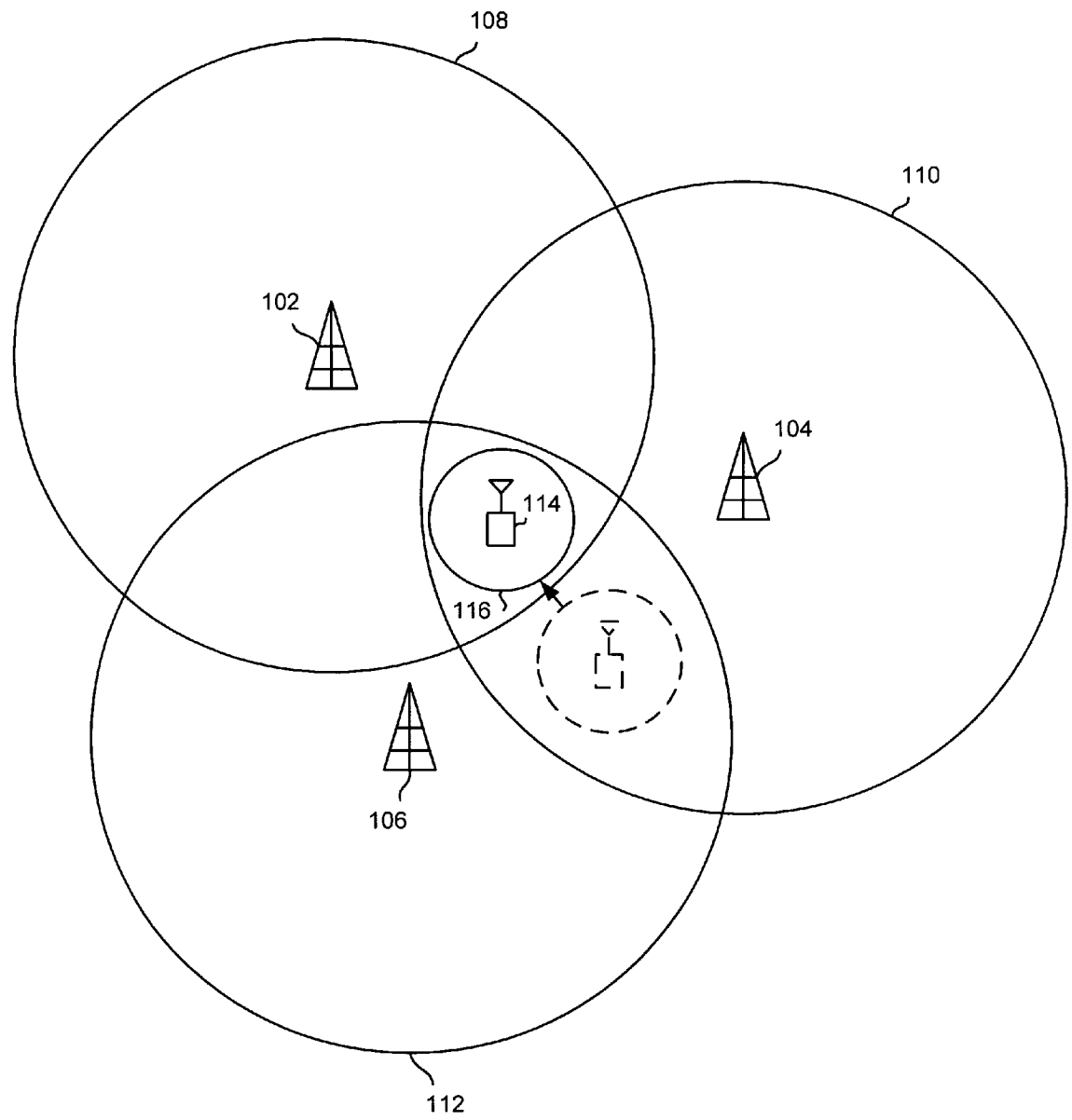
FIG. 3B is a block diagram illustrating an embodiment of a cellular network in which a small scale base station is configured to sense the local RF environment to detect that the geographic location of the small scale base station has changed.

FIG. 3B is a block diagram illustrating an embodiment of a cellular network in which a small scale base station is configured to sense the local RF environment to detect that the geographic location of the small scale base station has changed. In the example shown, the small scale base station 114 is shown to have been moved from an initial location as shown in FIG. 1 to a new location as shown in FIG. 3B. In this example, the small scale base station 114 would detect subsequent to the move all of the relevant signals detected in the original location and/or included in the signature, but would in addition detect, at the new location, as a result in this example of having been moved from an original location outside the coverage area 108 of BTS 102 to a new location within coverage area 108, a third beacon or other signal broadcast by BTS 102. As in the example described in connection with FIG. 3B, in various embodiments the detection of a new RF signal indicating that the small scale base station 114 has been moved in various embodiments causes the base station 114 to take responsive action, as described above.

In some embodiments, the small scale base station senses the local RF environment and reports a result to the core network and/or an element associated therewith, and the core network and/or associated element evaluates the sensed RF environment to determine if the reported environment has changed, as compared to a previous report and/or other information, in a manner that suggest the base station has (or may have) been moved.

Figure 4:
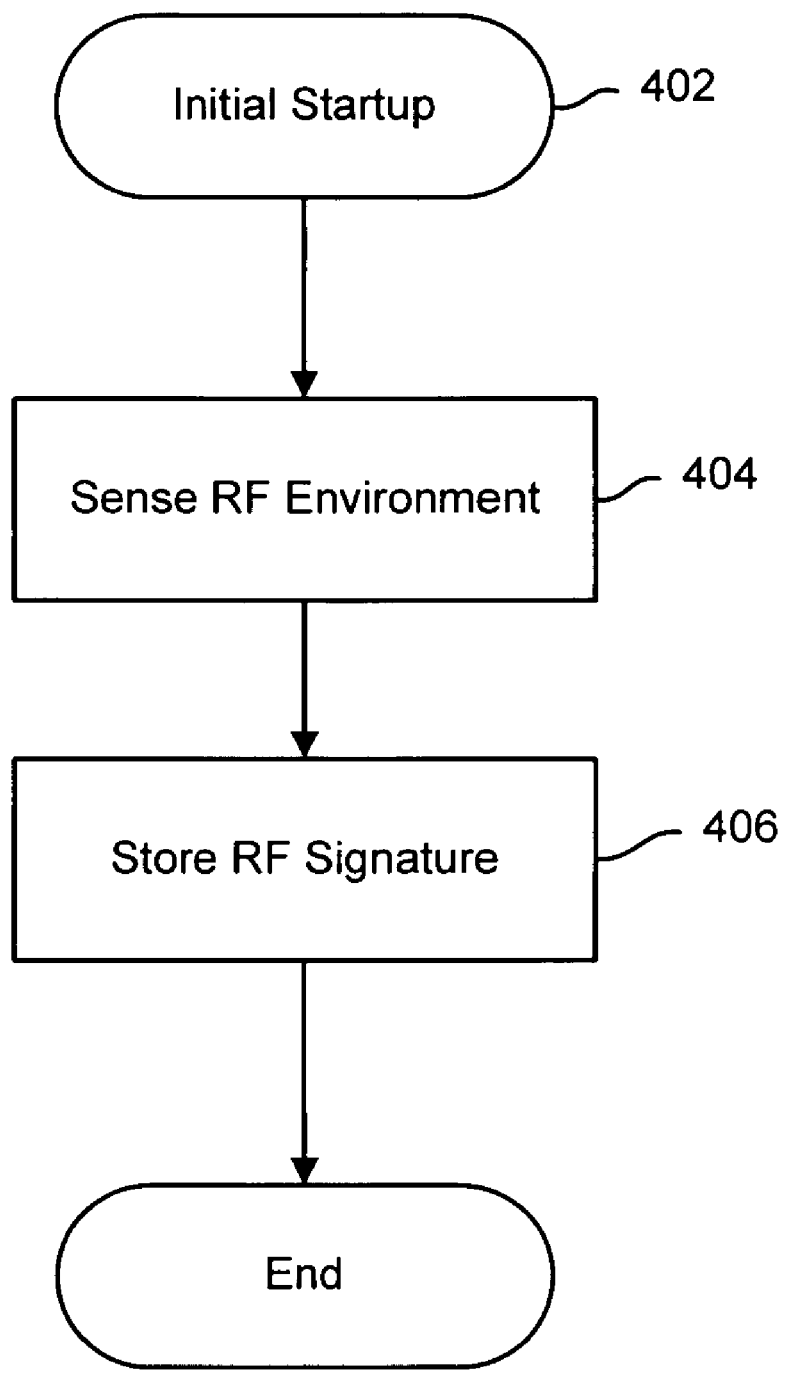
FIG. 4 is a flow chart illustrating an embodiment of a process for sensing an RF environment and storing a signature or other baseline data.

FIG. 4 is a flow chart illustrating an embodiment of a process for sensing an RF environment and storing a signature or other baseline data. In some embodiments, the process of FIG. 4 is implemented by a small scale base station or other potentially movable mobile network element, such as small scale base station 114. In the example shown, at initial startup (and/or at a prescribed time or under prescribed conditions subsequent to initial startup) 402, the local RF environment is sensed 404. In some embodiments, 404 includes scanning a relevant range of frequencies, such as the 900/1800 and 850/1900 MHz bands in the case of a small scale base station or other equipment associated with a GSM network. In some embodiments, the small scale base station or other equipment includes an RF monitor comprising a GSM or other receiver capable of receiving in one or more bands of interest. An RF signature (or other baseline) is determined and stored 406. In some embodiments, received signals are demodulated and/or decoded, if possible, to determine information to include in the signature and/or to decide which signal(s) should be included therein. For example, in some embodiments, a received signal having a frequency or other characteristic identifying it as a beacon or other broadcast signal, if detected, is demodulated and/or decoded to extract information such as a country and/or mobile network with which the broadcasting base station is associated. In some embodiments, the signature is stored at and/or by an equipment other than the base station or other equipment that sensed the RF environment, e.g., at an element of and/or associated with the core mobile network.

Figure 5:
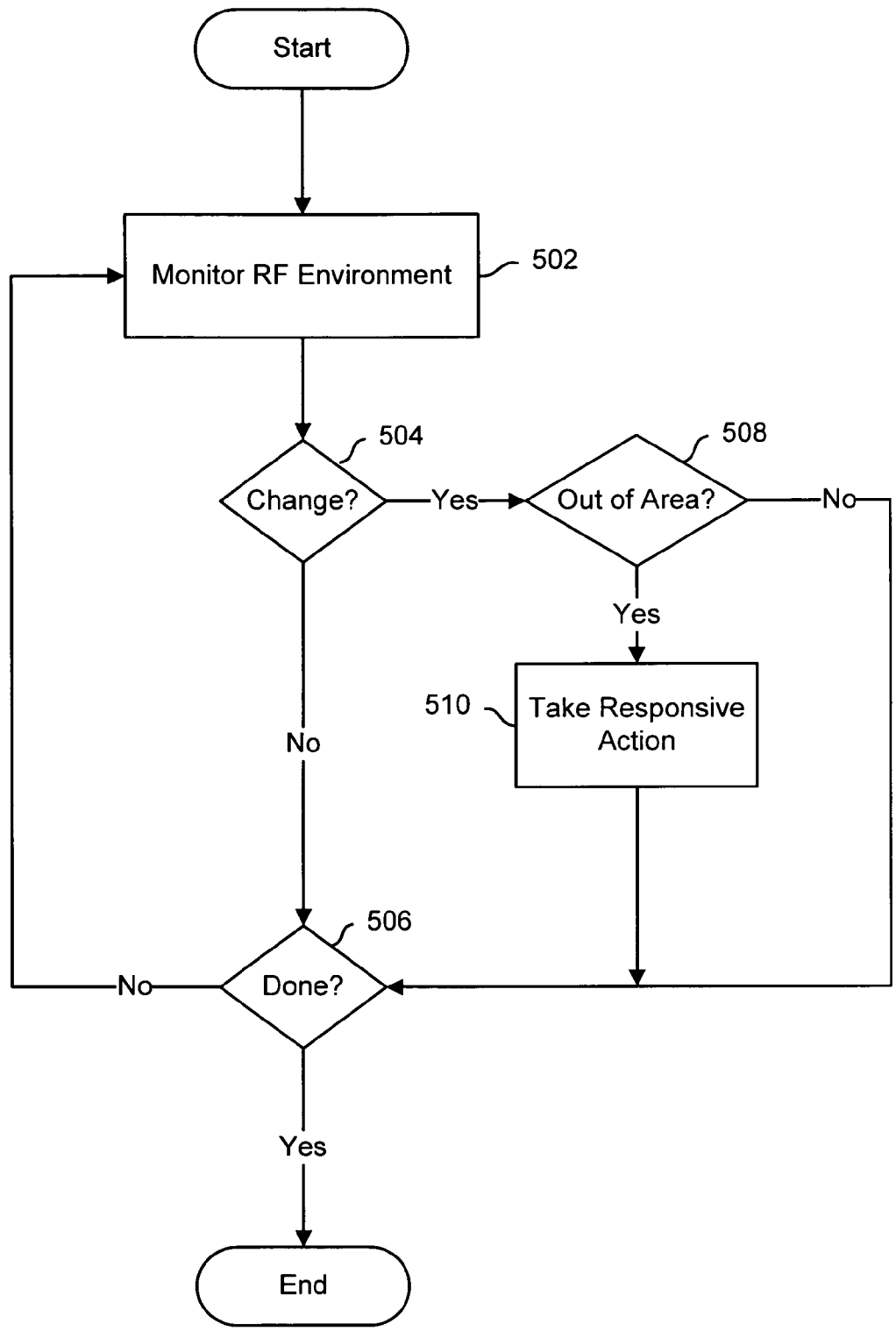
FIG. 5 is a flow chart illustrating an embodiment of a process for sensing an RF environment to detect a change in geographic location of a potentially movable base station or other equipment.

FIG. 5 is a flow chart illustrating an embodiment of a process for sensing an RF environment to detect a change in geographic location of a potentially movable base station or other equipment. In some embodiments, the process of FIG. 5 is performed by a small scale base station or other mobile network equipment capable of being moved. In some embodiments, the process of FIG. 5 is performed with respect to a small scale base station or other mobile network equipment capable of being moved by an equipment other than the small scale base station or other mobile network equipment capable of being moved. In the example shown, the RF environment in the location in which a small scale base station or other equipment is located is monitored 502. If a change in the RF environment is detected 504, and the nature of the change indicates that the base station or other equipment has been moved from an authorized location and/or area 508, responsive action is taken 510. Examples of a change in RF environment that indicate a base station or other equipment has (or may have) been moved from an authorized location and/or area include absence of a signal that was present previously and/or is known (or believed) to be present still at the authorized location and/or area, e.g., an adjacent macrocell beacon signal; presence of a new signal that was not present previously at the authorized location and/or area and/or that is known (or believed) to be associated with an unauthorized location and/or area; and/or detection (e.g., in a beacon or other broadcast signal) of a mobile country code (MCC), mobile network code (MNC), cell id, or other code or identifier not associated with the authorized location and/or area. Examples of a change in the RF environment that does not indicate that the associated base station or other equipment has been moved include absence of a previously present signal at a time when the absence is explained by a cause other than a change of geographic location, for example, absence of a previously present macro-BTS beacon or other broadcast signal at a time when the macro-BTS is known to have been taken out of service, e.g., due to an equipment casualty or malfunction or to perform maintenance. Examples of responsive action 510 include shutting down the base station or other equipment, denying access to the core mobile network, and sending an alert. The RF monitoring (502) and evaluation of any detected changes (504-510) continue until the process of FIG. 5 ends, e.g., upon shutdown, decommissioning, and/or redeployment of the associated small scale base station or other equipment.

Figure 6:
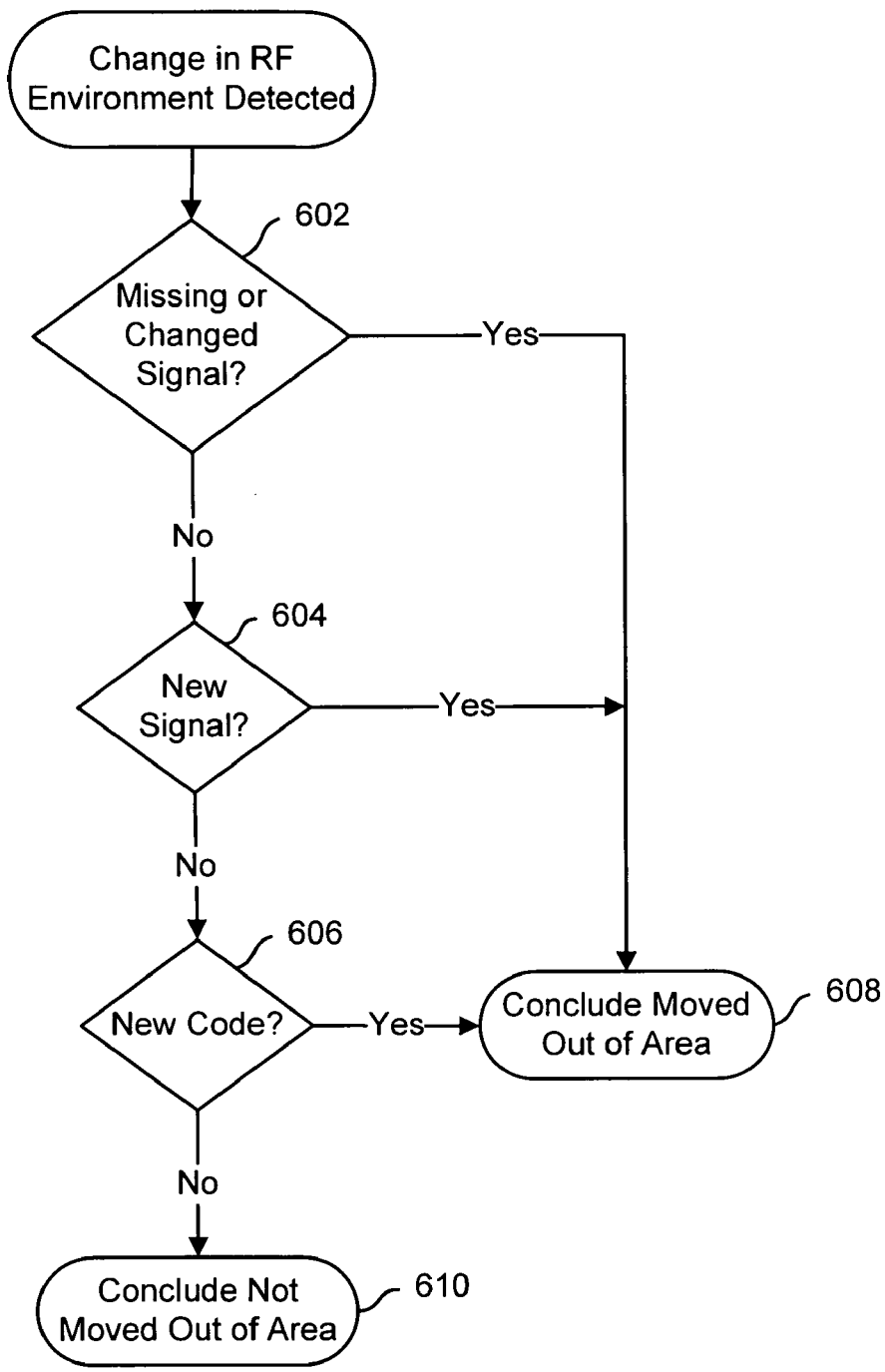
FIG. 6 is a flow chart illustrating an embodiment of a process for determining whether a change in a sensed RF environment indicates a base station or other equipment has been moved to a new geographic location.

FIG. 6 is a flow chart illustrating an embodiment of a process for determining whether a change in a sensed RF environment indicates a base station or other equipment has been moved to a new geographic location. In some embodiments, 508 of FIG. 5 includes the process of FIG. 6. In the example shown, if a signal that was present previously and/or is known and/or believed to be present still at the authorized location and/or area is missing or if a previously present signal is still present but a characteristic of the signal has changed in a way that suggests the base station or other equipment has been moved (e.g., received power) 602; a new signal that was not previously sensed at the authorized location and/or area and/or is known and/or believed to be associated with a location and/or area other than the authorized location and/or area has been sensed 604; and/or a beacon or other broadcast signal that includes a mobile country code (MCC), mobile network code (MNC), cell id, and/or other data known and/or believed to be associated with a location and/or area other than the authorized location and/or area has been sensed 606, it is concluded that the sensed RF environment has changed in a manner that indicates the associated small scale base station or other equipment has been moved to a new geographic location 608. Otherwise, it is concluded that the change does not indicate that the base station or other equipment has (or may have) been moved 610.

In some embodiments, a potentially movable base station or other equipment is equipped with a subscriber identity module (SIM) or a similar smart card and/or other device that includes an MCC and MNC associated with the authorized location and use of the base station or other equipment. In some such embodiments, 606 includes comparing a detected MCC and/or MNC and/or other data with corresponding data as stored in the SIM or similar device.

As described herein, sensing the local RF environment enables a change in the geographic location of a small scale base station or other potentially movable mobile network equipment to be detected. The techniques described herein may be used to prevent unauthorized transmission, the use of stolen equipment, and revenue losses potentially associated with unauthorized use of potentially movable equipment in a location and/or area other than one in which the network and/or service provider has authorized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
  sensing, by a cellular base station, a radio frequency environment, including receiving a broadcast signal that includes a radio frequency (RF) signature characteristic of a geographic location from a macrocell base transceiver station;

determining, by the cellular base station, whether the sensed radio frequency environment is different than a stored signature in a way that indicates the geographic location of the cellular base station has changed; and denying service by the cellular base station if the sensed radio frequency environment does not match the stored signature, wherein the cellular base station is configured to be communicatively coupled with a base station controller via an IP network and the base station controller is configured to be communicatively coupled to said macrocell base transceiver station.

2. The method of claim 1, further comprising repeatedly sensing the radio frequency environment.

3. The method of claim 1, wherein said determining comprises detecting a country code that is not present in the stored signature.

4. The method of claim 1, wherein the stored signature comprises radio frequency environment information sensed at a prior time.

5. The method of claim 1, wherein said determining comprises one or more of following: detecting a signal that is not present in the stored signature; detecting a country code that is not present in the stored signature; detecting a mobile network code that is not present in the stored signature; and detecting a signal associated with said macrocellular base transceiver station that an original geographic location with which the stored signature is associated is not within a coverage area.

6. The method of claim 1, wherein said determining comprises one or more of following: determining that a signal present in the stored signature is not present in the sensed radio frequency environment; determining that a country code present in the stored signature is not present in the sensed radio frequency environment; determining that a mobile network code present in the stored signature is not present in the sensed radio frequency environment; and determining that a beacon or other signal associated with said macrocellular base transceiver station that an original geographic location with which the stored signature is associated is not present in the sensed radio frequency environment.

7. The method of claim 1, wherein said determining comprises determining that a signal present in the stored signature is present in the sensed radio frequency environment but at a signal strength that is different than a level associated with the stored signature.

8. The method of claim 1, wherein said determining comprises determining that a difference between the sensed radio frequency environment and the stored signature indicates that the cellular base station has been moved.

9. The method of claim 1, wherein said determining comprises determining that a difference between the sensed radio frequency environment and the stored signature would not be present unless the cellular base station had been moved.

10. The method of claim 1, wherein said determining comprises determining that a difference between the sensed radio frequency environment and the stored signature is not explained by a known change in the radio frequency environment at an original geographic location with which the stored signature is associated.

11. A cellular base station, comprising:
a storage configured to store a baseline;
a transceiver configured to sense a radio frequency environment, including receiving a broadcast signal that includes a radio frequency (RF) signature characteristic of a geographic location from a macrocell base transceiver station; and a processor coupled to the storage and configured to:
determine whether the sensed radio frequency environment is different than the stored baseline in a way that indicates the geographic location of the cellular base station has changed; and
deny service by the cellular base station if the sensed radio frequency environment does not match the stored baseline,
wherein the cellular base station is configured to be communicatively coupled with a base station controller via an IP network and the base station controller is configured to be communicatively coupled with said macrocell base transceiver station.

12. The cellular base station of claim 11, wherein the transceiver is configured to repeatedly sense the radio frequency environment.

13. The cellular base station of claim 11, further comprising a communication interface and wherein the processor is further configured to report the sensed frequency environment to a mobile network with which the cellular base station is associated.

14. The cellular base station of claim 13, wherein the communication interface comprises an IP network interface.

15. A computer program product for detecting that a cellular base station has been moved to a new geographic location, the computer program product being embodied in a non-transitory computer readable medium and comprising computer instructions for:
sensing, by the cellular base station, a radio frequency environment, including receiving a broadcast signal that includes a radio frequency (RF) signature characteristic of a geographic location from a macrocell base transceiver station;
storing, by the cellular base station, a baseline based on the sensed radio frequency environment;
subsequently sensing, by the cellular base station, the radio frequency environment;
determining, by the cellular base station, whether the subsequently sensed radio frequency environment is different than the stored baseline in a way that indicates the geographic location of the cellular base station has changed; and
denying service by the cellular base station if the subsequently sensed radio frequency environment does not match the stored baseline,
wherein the cellular base station is configured to be communicatively coupled with a base station controller via an IP network, and the base station controller is configured to be communicatively coupled to the macrocell base transceiver station.

16. The method of claim 1, wherein a coverage area of the cellular base station is completely within a coverage area of another cellular base station, and wherein the cellular base station, detects a previously undetected cellular base station.

17. The cellular base station of claim 11, wherein a coverage area of the cellular base station is completely within a coverage area of another cellular base station, and wherein the cellular base station detects a previously undetected cellular base station.

18. The computer program product of claim 15, wherein a coverage area of the cellular base station is completely within a coverage area of another cellular base station, and wherein the cellular base station detects a previously undetected cellular base station.

19. The cellular base station of claim 11, wherein the cellular base station is connected to the IP network which, in turn, is connected to an aggregate gateway, wherein the aggregate gateway is connected to the base station controller via a dedicated line.

20. The cellular base station of claim 19, wherein the dedicated line is communicatively disposed on a cellular-phone side of the base station controller.

21. The cellular base station of claim 19, wherein the dedicate line is not communicatively disposed on a core-mobile network side of the base station controller.

* * * * *

UNITED STATES PATENT AND TRADEMARK OFFICE
CERTIFICATE OF CORRECTION

| | | |
|---|---|---|
| PATENT NO. | : 8,280,366 B2 | Page 1 of 1 |
| APPLICATION NO. | : 11/645157 | |
| DATED | : October 2, 2012 | |
| INVENTOR(S) | : Hirano et al. | |

It is certified that error appears in the above-identified patent and that said Letters Patent is hereby corrected as shown below:

On the Title Page
Item (57) ABSTRACT, please replace "detecting" with --detect--.

Column 7
Line 22, Claim 5, please replace "of following" with --of the following--.

Column 7
Line 31, Claim 6, please replace "of following" with --of the following--.

Column 8
Line 55, Claim 16, please replace "station, detects" with --station detects--.

Column 10
Line 2, Claim 21, please replace "dedicate" with --dedicated--.

Signed and Sealed this
Second Day of April, 2013

Teresa Stanek Rea
*Acting Director of the United States Patent and Trademark Office*